(12) United States Patent
Comtois (10) Patent No.: US 11,122,772 B2
(45) Date of Patent: Sep. 21, 2021

(54) ANIMAL FEEDING APPARATUS

(71) Applicant: PetSmart Home Office, Inc., Phoenix, AZ (US)

(72) Inventor: Mark C. Comtois, Alexandria, VA (US)

(73) Assignee: PetSmart Home Office, Inc., Phoenix, AZ (US)

(*) Notice: Subject to any disclaimer, the term of this patent is extended or adjusted under 35 U.S.C. 154(b) by 739 days.

(21) Appl. No.: 15/834,811

(22) Filed: Dec. 7, 2017

(65) Prior Publication Data

US 2019/0174714 A1   Jun. 13, 2019

(51) Int. Cl.
*A01K 5/01*   (2006.01)
*A01K 7/00*   (2006.01)

(52) U.S. Cl.
CPC ............ *A01K 5/0135* (2013.01); *A01K 7/005* (2013.01)

(58) Field of Classification Search
CPC ........ A01K 5/0135; A01K 5/01; A01K 7/005; A01K 1/0356
USPC ........................................ 248/222.51, 222.52
See application file for complete search history.

(56) References Cited

U.S. PATENT DOCUMENTS

| | | | |
|---|---|---|---|
| 1,647,069 A | 8/1927 | Ahlman | |
| 2,331,511 A | 2/1940 | Schiffman | |
| 2,931,471 A * | 4/1960 | Howard, Jr. | F16B 5/10 403/22 |
| 3,661,121 A | 5/1972 | Zielin | |
| 4,204,501 A | 5/1980 | Karlsson et al. | |
| 4,787,337 A * | 11/1988 | Mayer | A01K 1/0356 119/477 |
| 5,421,289 A | 6/1995 | Capellaro | |
| 5,467,733 A | 11/1995 | Messina | |
| D383,252 S | 9/1997 | Pearce | |
| D383,877 S | 9/1997 | Doornbos | |
| 5,676,091 A * | 10/1997 | Pennington | A01K 39/0106 119/477 |
| 5,738,042 A | 4/1998 | King | |
| 5,832,872 A | 11/1998 | Pearce | |
| 5,855,184 A | 1/1999 | Eichler et al. | |
| 6,082,573 A * | 7/2000 | Hofman | A47K 3/281 220/480 |
| 6,189,489 B1 | 2/2001 | Pearce | |
| D447,012 S | 8/2001 | Owens et al. | |
| 6,543,627 B1 * | 4/2003 | Schiavo | A47B 96/025 211/26 |
| 6,561,129 B1 | 5/2003 | Cheng | |
| 6,901,880 B2 | 6/2005 | Hammer | |
| 6,929,226 B1 * | 8/2005 | Philistine | F16B 21/02 248/222.12 |
| 7,857,274 B1 | 12/2010 | Parks | |
| 8,001,931 B2 | 8/2011 | Deese et al. | |
| D682,483 S | 5/2013 | Silverman | |

(Continued)

FOREIGN PATENT DOCUMENTS

CN   203765318 U   8/2014

*Primary Examiner* — Peter M Poon
*Assistant Examiner* — Marisa V Conlon
(74) *Attorney, Agent, or Firm* — Duane Morris LLP (57) ABSTRACT

An animal feeding apparatus can include a container shaped to hold food or water and a support to which the container can be removably mounted and releasably locked. The support can be configured to prevent the container from tipping while enabling easy removal of the container from the support for cleaning or replacement.

19 Claims, 12 Drawing Sheets

(56) References Cited

U.S. PATENT DOCUMENTS

| | | | |
|---|---|---|---|
| 9,750,358 B2* | 9/2017 | Jagger | A47G 19/10 |
| 9,863,576 B1* | 1/2018 | Cifers | F16B 35/06 |
| 10,435,117 B1* | 10/2019 | Cifers | B63B 32/77 |
| 2006/0249089 A1* | 11/2006 | Behunin | A01K 7/005 |
| | | | 119/61.57 |

* cited by examiner

ANIMAL FEEDING APPARATUS

FIELD

This patent application relates to feeding apparatuses for animals. The feeding apparatuses can include components that are removably mountable and releasably lockable relative to one another.

BACKGROUND

Veterinary hospitals often keep animal patients in cages while the animals are sedated and recovering from surgery. Animals, especially sedated animals, have a tendency to tip unanchored food and water containers and spill their contents. Therefore, existing animal food containers are often anchored to a wall. While anchoring may prevent an animal from tipping a container, veterinary staff must disconnect the container before cleaning the animal's cage. The disconnection process can be disruptive, especially if the veterinary hospital has many animal patients.

SUMMARY

Various embodiments of the present disclosure provide an animal feeding apparatus. The animal feeding apparatus includes a container shaped to hold food or water and a support to which the container can be removably mounted and releasably locked to prevent the container from tipping yet enable easy removal of the container from the support for cleaning or replacement.

An animal feeding apparatus can include a container and a support. The container can include a wall and a locking device attached to the wall. The locking device can include a shaft and a locking bar transverse to the shaft. The support can include a wall defining an opening therethrough and a stop element attached to the wall. The opening can have an open end and a closed end and can be sized to laterally receive the shaft through the open end. The stop element can be positioned to limit rotation of the container relative to the support when the shaft is received in the opening and positioned at the closed end of the opening.

An animal feeding apparatus can include: (A) a container comprising a wall and a locking device attached to the wall. The locking device can include a shaft and a locking element transverse to the shaft. (B) A support including a wall defining an opening therethrough that is sized and shaped to enable the locking device to pass therethrough to mount the container to the support.

The shaft and the wall of the support can be sized to, when the container is mounted to the support, enable rotation of the container between an unlocked position in which the container can be removed from the support and a locked position in which the container cannot be removed from the support.

DETAILED DESCRIPTION

FIGS. 1A-3D illustrate one example embodiment of the animal feeding apparatus 10 of the present disclosure and components of the animal feeding apparatus 10. The animal feeding apparatus 10 includes a container 100 shaped to hold food or water and a support 300 to which the container 100 can be removably mounted and releasably locked to prevent the container 100 from tipping yet enable easy removal of the container 100 from the support 300 for cleaning or replacement.

More specifically, the container 100 is mountable to the support 300 via insertion of a locking device 200 of the container 100 into a locking device receiving opening defined in the support 300. After being mounted to the support 300, the container 100 is lockable to the support 300 via rotation of the locking device 200 relative to the support 300 from an unlocked rotational position to a locked rotational position. The container 100 is unlockable from the support 300 via rotation of the locking device 200 relative to the support 300 from the locked rotational position to the unlocked rotational position. After being unlocked from the support 300, the container 100 is removable from the support 300 via removing the locking device 200 from the locking device receiving opening.

Figure 1A:
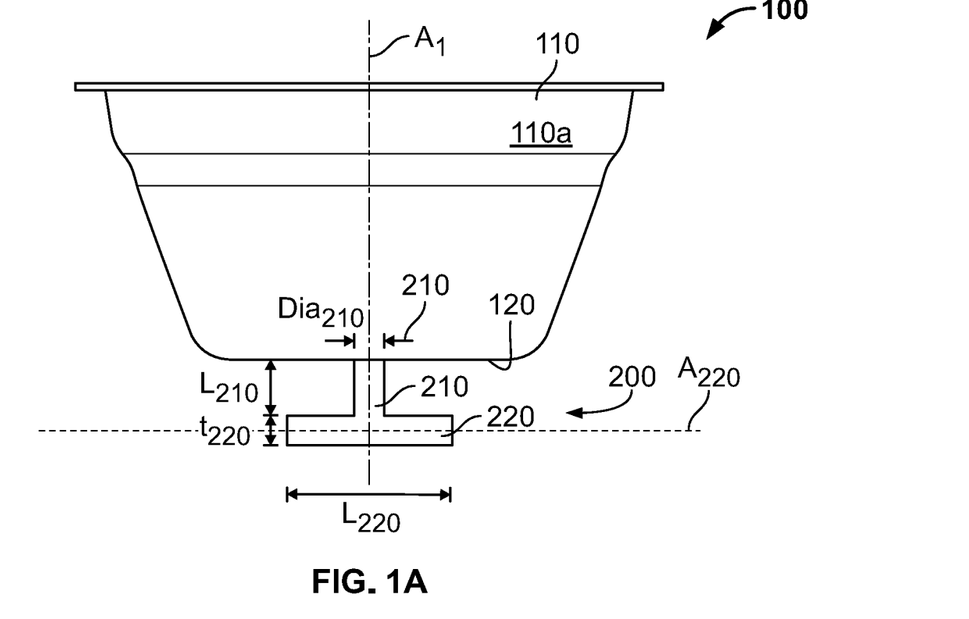
FIG. 1A is a front elevational view of the container of a first one example embodiment of the animal feeding apparatus of the present disclosure.
Figure 1B:
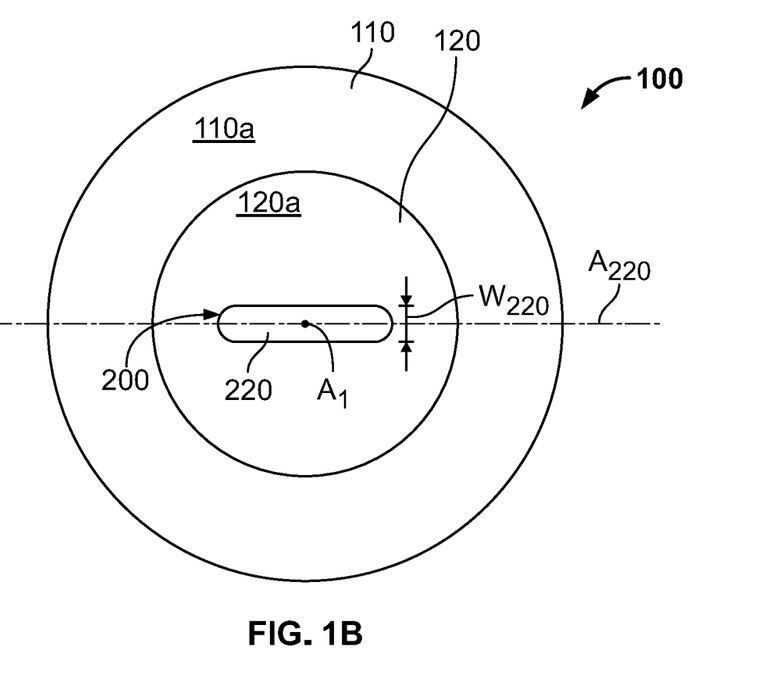
FIG. 1B is a bottom plan view of the container of FIG. 1A.

As shown in FIGS. 1A and 1B, the container 100 includes a side wall 110 and bottom wall 120 connected to (and here integrally formed with) the side wall 110. The side wall 110 has a side wall outer surface 110a and a side wall inner surface (not shown). The bottom wall 120 has a bottom wall outer surface 120a and a bottom wall inner surface (not shown). The side and bottom wall inner surfaces form a cavity shaped to receive and retain food, water, or other solids or liquids. The side wall 110 and the bottom wall 120 are centered on and symmetric about an axis $A_1$. The side wall and the bottom wall can take any suitable shape(s). In other embodiments the side wall or the bottom wall are not symmetric about the axis $A_1$.

As best shown in FIGS. 1A and 1B, the locking device 200 includes a shaft 210 and a locking bar 220 connected to (and here integrally formed with) the shaft 210 at one end of the shaft 210. The shaft 210 is fixedly attached (such as via welding) at its other end to the bottom wall 120 to move therewith. The shaft 210 is oriented such that a longitudinal axis of the shaft 210 is coaxial with the axis $A_1$. The shaft 210 has a length $L_{210}$, a diameter $Dia_{210}$, and a circular transverse cross-section. In other embodiments, the transverse cross-section of the shaft can take any suitable shape.

The length $L_{210}$ and the diameter $Dia_{210}$ can be any suitable values in accordance with their relationships with other dimensions set forth herein.

The locking bar 220 is oriented such that its longitudinal axis $A_{220}$ is coplanar with and transverse to (here perpendicular to) the axis $A_1$ (and therefore the longitudinal axis of the shaft 210). The locking bar 220 has a length $L_{220}$, a width $W_{220}$, and a thickness $t_{220}$, which can be any suitable values in accordance with their relationships with other dimensions set forth herein. The width $W_{220}$ of the locking bar 220 is equal to the diameter $Dia_{210}$ of the shaft 210, though these values can differ in other embodiments. The locking bar 220 has rounded ends and a rectangular cross section transverse to its longitudinal axis $A_{220}$, but can have any suitably shaped cross-section or planar ends in other embodiments.

Figure 2A:
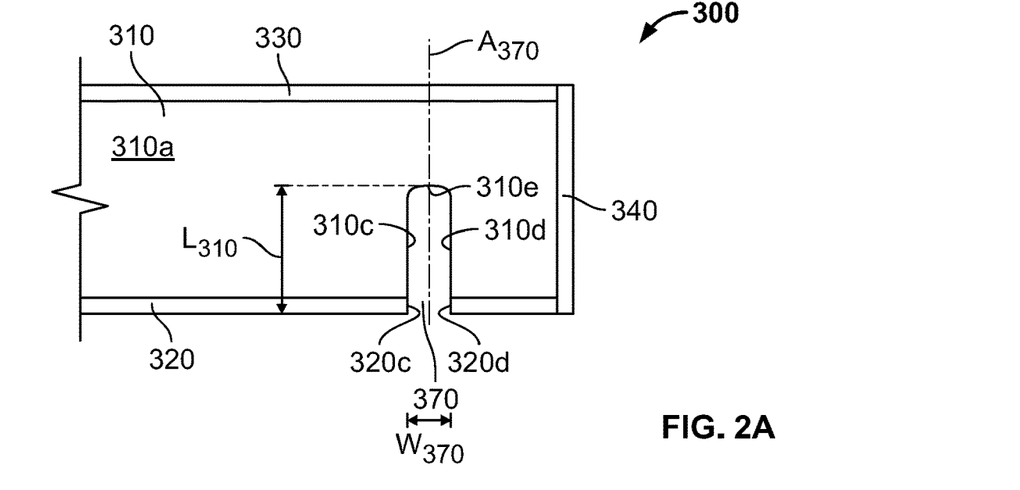
FIG. 2A is a fragmentary top plan view of the support of the first example embodiment of the animal feeding apparatus.
Figure 2B:
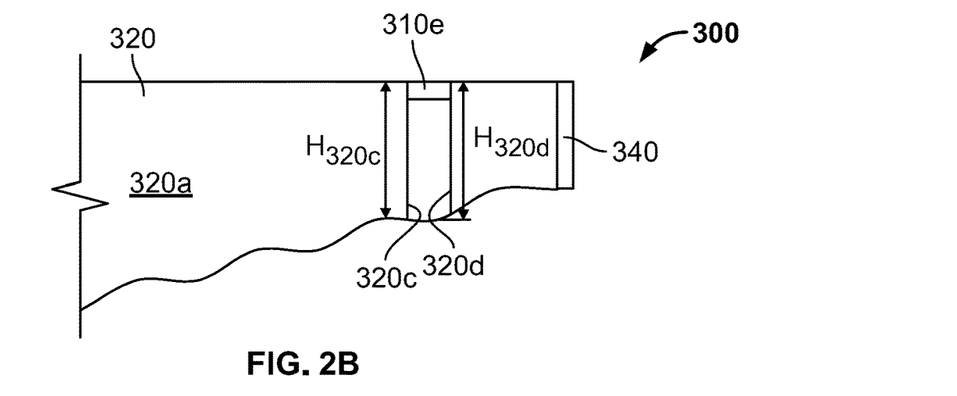
FIG. 2B is a fragmentary side elevational view of the support of FIG. 2A.
Figure 2C:
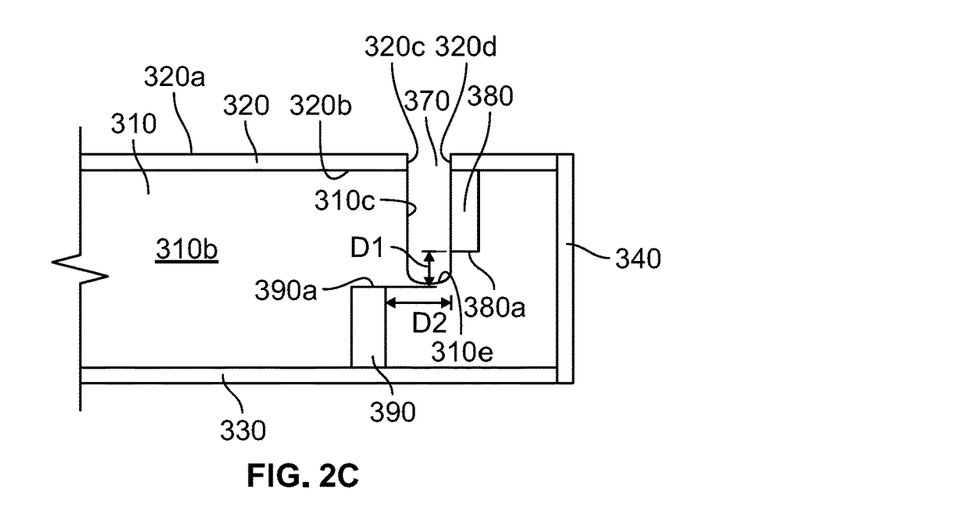
FIG. 2C is a fragmentary bottom plan view of the support of FIG. 2A.

As best shown in FIGS. 2A-2C, the support 300 includes a planar top wall 310, a planar first side wall 320, a planar second side wall 330, and a planar front wall 340 (though they need not be planar in other embodiments). The top wall 310 is attached to the first side wall 320, the second side wall 330, and the front wall 340; the first side wall 320 is attached to the top wall 310 and the front wall 340; the second side wall 330 is attached to the top wall 310 and the front wall 340; and the front wall 340 is attached to the top wall 310, the first side wall 320, and the second side wall 330. The top wall 310, the first side wall 320, the second side wall 330, and the front wall 340 are oriented transversely (here, perpendicularly) to one another. Alternatively, the first side wall 310, the second side wall 320, and the front wall 340 may each attach to the underside of top wall 310.

Although not shown here, the support 300 also includes a rear wall opposite the front wall 340 and connected to the top wall 310, the first side wall 320, and the second side wall 330. The rear wall 340 includes a suitable device or suitable devices configured to removably mount the support 300 to (or enable the support 300 to be removably mounted to) a wall, a cage, or another suitable object.

The top wall 310 includes a planar top wall outer surface 310a; a planar top wall inner surface 310b; and locking device receiving opening defining surfaces 310c, 310d, and 310e transverse to and extending between the top wall outer and inner surfaces 310a and 310b. The thickness of the top wall 310 (not labeled) is smaller than the length $L_{210}$ of the shaft 210 to enable the container 100 to be mounted to the support 310 (described below). The first side wall 320 includes a planar first side wall outer surface 320a, a planar first side wall inner surface 320b, and locking device receiving opening defining surfaces 320c and 320d transverse to and extending between the first side wall outer and inner surfaces 320a and 320b.

The locking device receiving opening defining surfaces 310c, 310d, 310e, 320c, and 320d define a locking device receiving opening 370 through the top wall 310 and the first side wall 320. In this illustrated embodiment, the locking device receiving opening 370 is a slot having an open end (at the second side wall 320) and a closed end (at the wall 310e). The locking device receiving opening 370 has a length $L_{370}$, a width $W_{370}$, and a longitudinal axis $A_{370}$. The width $W_{370}$ of the locking device receiving opening 370 is slightly larger than the diameter $Dia_{210}$ of the shaft 210 to enable the locking device receiving opening 370 to receive the shaft 210 without interference. In other embodiments, the width of the locking device receiving opening is equal to the diameter of the shaft to provide a partial radial interference fit when receiving the shaft. The length $L_{370}$ of the locking device receiving opening 370 is such that when the container 100 is mounted and locked to the support 300, the axis $A_1$ is positioned generally midway between the first and second side walls 320 and 330, though it can be any suitable length in other embodiments. The longitudinal axis $A_{370}$ of the locking device receiving opening 370 is generally parallel to the front wall 340 and transverse to (here, generally perpendicular to) the first and second side walls 320 and 330 (though it may be oriented in any manner in other embodiments).

As best shown in FIG. 2C, cuboid (or other suitably shaped) first and second stop elements 380 and 390 are attached to the inner surface 310b of the top wall 310. The first stop element 380 is positioned between the locking device receiving opening 370 and the front wall 340, and the second stop element 380 is positioned between the locking device receiving opening 370 and the rear wall (not shown). The first stop element 380 includes a planar (or other suitably shaped) first stop surface 380a and is oriented such that the first stop surface 380a faces the second side wall 330. The second stop element 390 includes a planar (or other suitably shaped) second stop surface 390a and is oriented such that the second stop surface 390a faces the first side wall 320.

The first and second stop surfaces 380a and 390a are generally parallel and are separated by a distance $D_1$ in the direction of the length $L_{370}$ of the locking device receiving opening 370. The distance D1 is greater than the width $W_{220}$ of the locking bar 220. This ensures that the locking bar 220 has room to rotate and contact the first and second stop surfaces 380a and 390a as the container 100 is rotated relative to the support 300 from the unlocked rotational position to the locked rotational position. The edges of the first and second stop surfaces 380a and 390a closest to the locking device receiving opening 370 are separated by a distance $D_2$ in the direction of the width $W_{370}$ of the locking device receiving opening 370. The distance $D_2$ is smaller than the length $L_{220}$ of the locking bar 220 and longer than or equal to the width $W_{370}$ of the receiving opening 370. This ensures that the locking bar 220 contacts the first and second stop surfaces 380a and 390a when the container 100 is in the locked rotational position.

Figure 3A:
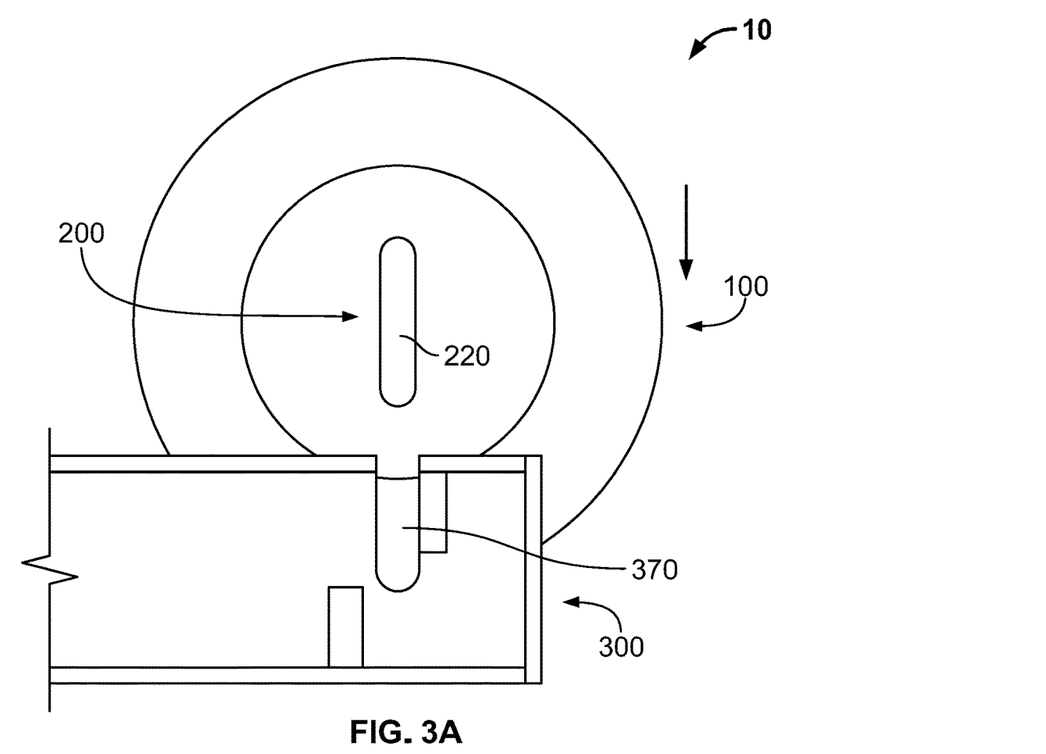
FIG. 3A is a fragmentary bottom plan view of the first example embodiment of the animal feeding apparatus before the locking device of the container is inserted into the locking device receiving opening of the support.

As noted above, the container 100 is removably mountable to and releasably lockable to the support 300 via the locking device 200. To mount the container 100 to the support 300, a user first positions the container 100 such that: (1) the container 100 is in the unlocked rotational position relative to the support 300; and (2) the locking bar 220 is positioned below the bottom surface 310b of the top wall 310 of the support 300 such that the top wall 310 is positioned between the locking bar 220 and the outer surface 120a of the bottom wall 120 of the container 100, as shown in FIG. 3A. In this example embodiment, the container 100 is in the unlocked rotational position relative to the support 300 when the longitudinal axis $A_{220}$ of the locking bar 220 is coplanar with the longitudinal axis $A_{370}$ of the locking device receiving opening 370.

Figure 3B:
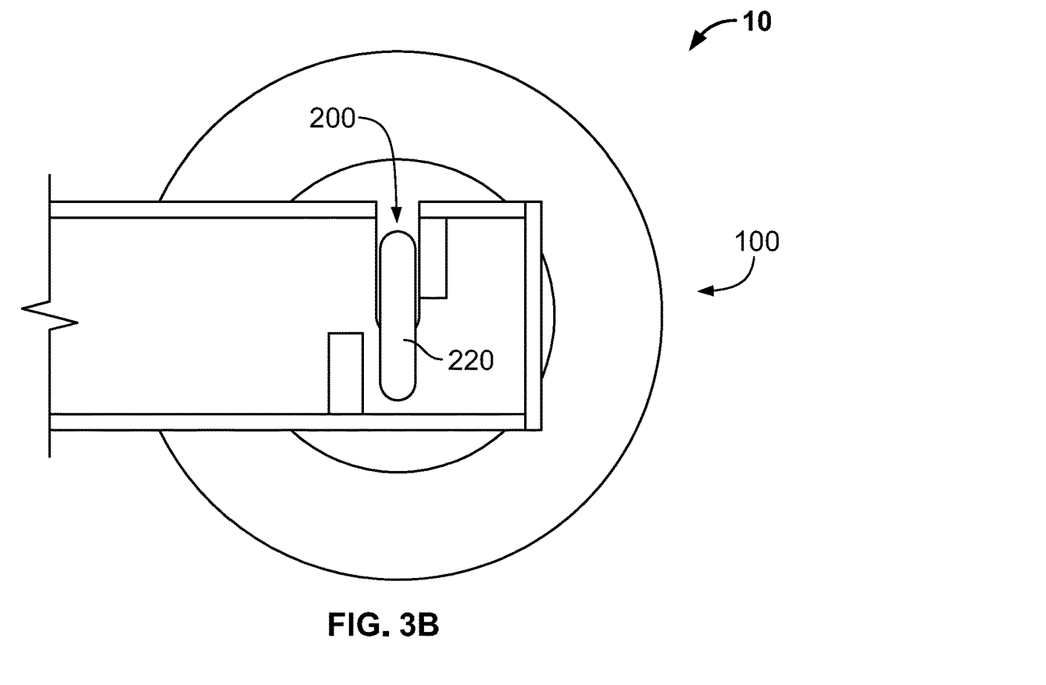
FIG. 3B is a fragmentary bottom plan view of the first example embodiment of the animal feeding apparatus after the locking device has been received in the locking device receiving opening of the support and while the container is in an unlocked rotational position relative to the support.

While maintaining the container 100 in the unlocked rotational position relative to the support 300, the user then laterally moves the container 100 along the longitudinal axis $A_{370}$ of the locking device receiving opening 370 toward the second side wall 330 of the support 300 such that the shaft 210 is received in the locking device receiving opening 370 via its open end. The user continues laterally moving the container 100 in this direction until the shaft 210 reaches the closed end of the locking device receiving opening 370 and contacts the surface 310e, as shown in FIG. 3B. As this occurs, the locking bar 220 passes through the portion of the locking bar receiving opening 370 defined through the first side wall 320. At this point, an upper surface of the locking bar 220 is slightly spaced apart from and positioned below the inner surface 310b of the top wall 310, and the outer surface 120a of the bottom wall 120 of the container 100 contacts the outer surface 310a of the top wall 310. At this point, the container 100 is mounted to the support 300.

Figure 3C:
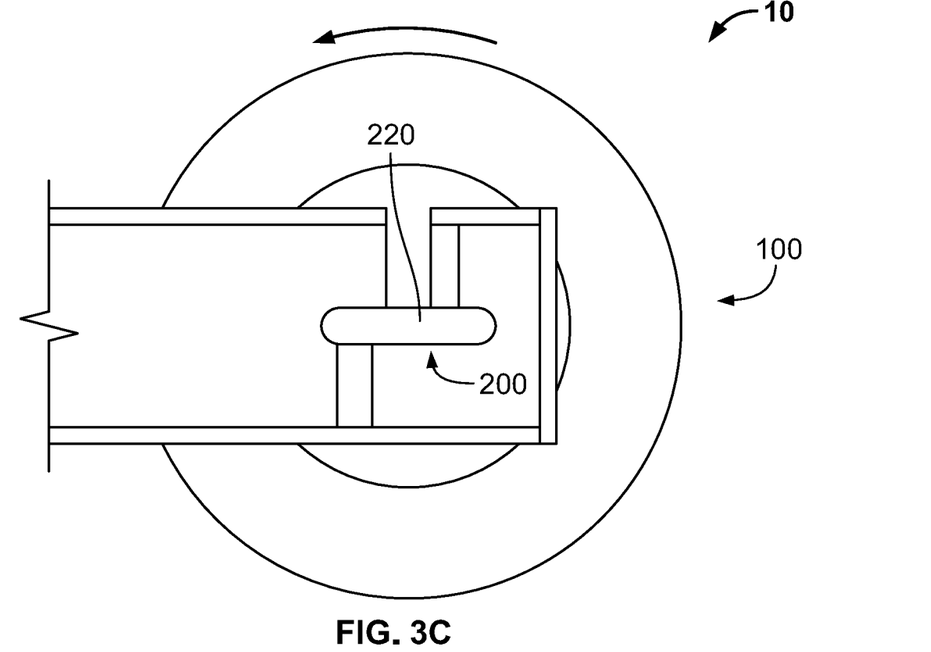
FIG. 3C is a fragmentary bottom plan view of the first example embodiment of the animal feeding apparatus after the container has been rotated relative to the support into a locked rotational position.
Figure 3D:
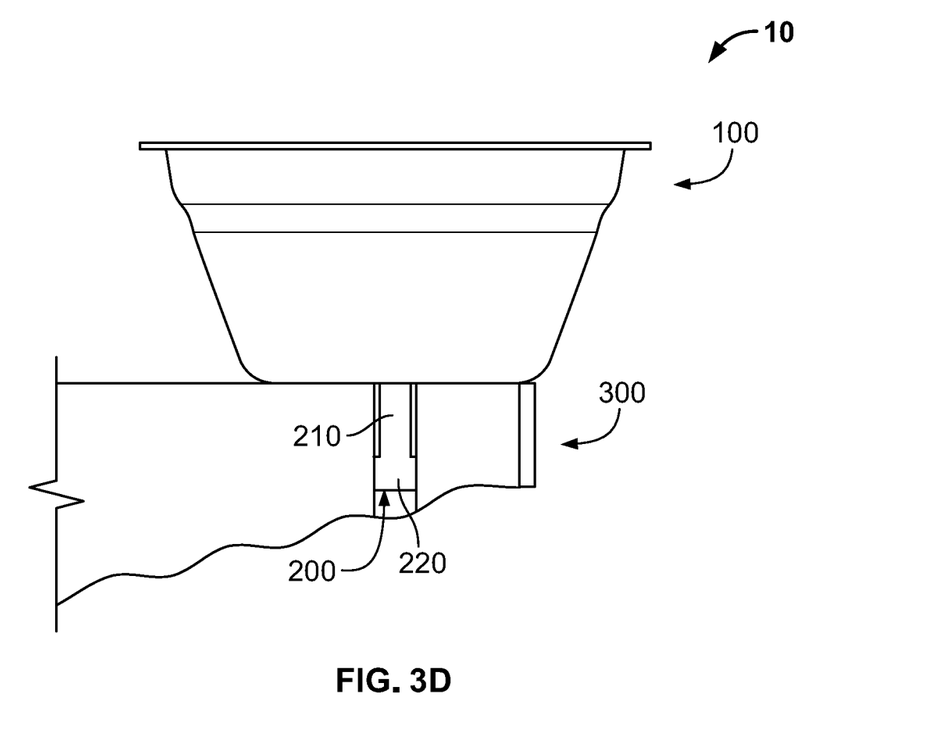
FIG. 3D is a fragmentary side elevational view of the first example embodiment of the animal feeding apparatus with the container in the locked rotational position shown in FIG. 3C.

To (releasably) lock the container 100 to the support 300, the user rotates the container 100 90 degrees (or any other suitable angle in other embodiments) relative to the support 300 from the unlocked rotational position to the locked rotational position. When in the locked rotational position, as shown in FIGS. 3C and 3D, the locking bar 220 contacts the first and second stop surfaces 380a and 390a of the first and second stop elements 380 and 390, and the longitudinal axis $A_{220}$ of the locking bar is transverse to (here, perpendicular to) the longitudinal axis $A_{370}$ of the locking device receiving opening 370. In this example embodiment, the first and second stop elements 380 and 390 are sized, shaped, and positioned such that they prevent the container 100 from rotating any further after the container 100 reaches the locked rotational position.

When the container 100 is locked to the support 300, non-rotational movement of the container 100 relative to the support 300 is constrained.

First, the fact that the length $L_{210}$ of the shaft 210 is slightly larger than the thickness of the top wall 310 of the support 300 provides little room for the container 100 to move in a direction parallel to the axis $A_1$ when the container 100 is locked to the support 300. Contact between the outer surface 120a of the bottom wall 120 of the container 100 and the outer surface 310a of the top wall 310 of the support 300 or contact between the locking bar 220 and the inner surface 310b of the top wall 310 stops any such movement.

Second, the fact that the locking bar 220 contacts the first and second stop surfaces 380a and 390a of the first and second stop elements 380 and 390 and that the shaft 210 contacts the surface 370e prevents substantial movement of the container 100 relative to the support 300 in a direction parallel to the longitudinal axis $A_{370}$ of the locking device receiving opening 370 when the container 100 is locked to the support 300.

Third, the fact that the width $W_{370}$ of the locking device receiving opening 370 is slightly larger than the diameter $Dia_{210}$ of the shaft 210 provides little room for the shaft 210 (and therefore the container 100) to move between the surfaces 370c and 370d relative to the support 300 in a direction transverse (here, perpendicular) to the longitudinal axis $A_{370}$ of the locking device receiving opening 370 when the container 100 is locked to the support 300. Contact between the shaft 210 and the surface 370c or the surface 370d stops any such movement.

To unlock the container 100 from the support 300, the user rotates the container 100 relative to the support 300 from the locked rotational position to the unlocked rotational position. To remove the container 100 from the support 300, the user moves the container 100 parallel to the longitudinal axis $A_{370}$ of the locking device receiving opening 370 until the shaft 210 of the locking device 200 is removed from the locking device receiving opening 370.

The container 100 and the support 300 are therefore configured such that: (1) the container 100 can be removably mounted and releasably locked to the support 300 via a quick slide and twist motion (and vice-versa), which enables easy removal of containers 100 for replacement or cleaning; and (2) non-rotational movement of the container 100 relative to the support 300 is substantially constrained when mounted and locked to the support 300 to prevent the container 100 from tipping and spilling its contents.

FIGS. 4A-4E illustrate another example embodiment of the animal feeding apparatus of the present disclosure and components of the animal feeding apparatus. Many components of this example embodiment of the animal feeding apparatus are similar (or identical) to those of the animal feeding apparatus 10, so like components of this example embodiment of the animal feeding apparatus are given like numbering (prefaced by a "1"). Certain differences between the embodiments are described below.

Figure 4A:
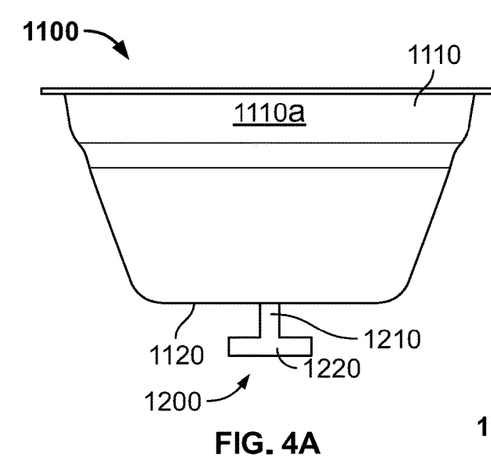
FIG. 4A is a front elevational view of the container of a second example embodiment of the animal feeding apparatus of the present disclosure.
Figure 4B:
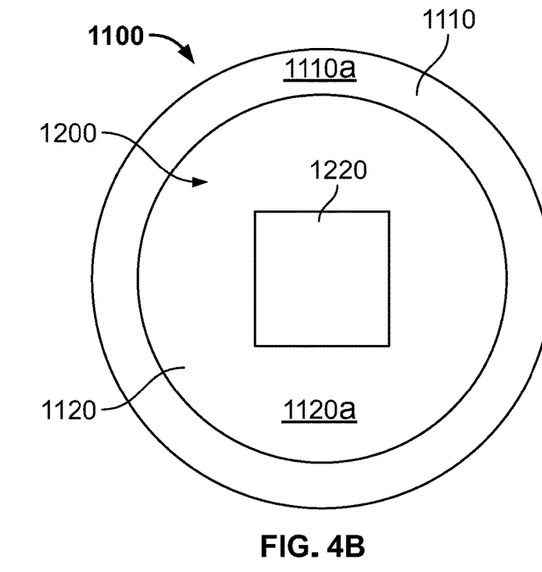
FIG. 4B is a bottom plan view of the container of FIG. 4A.
Figure 4C:
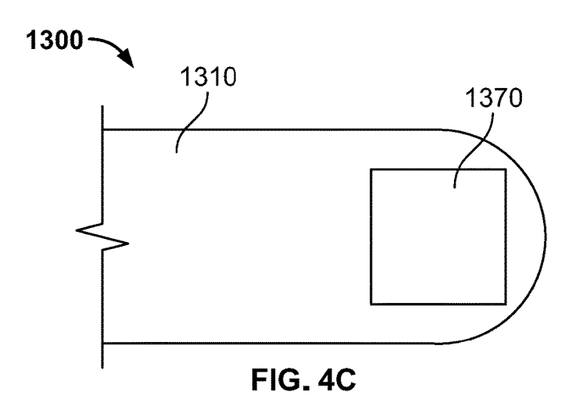
FIG. 4C is a fragmentary top plan view of the support of the second example embodiment of the animal feeding apparatus.

In this example embodiment, the locking device 1200 includes a cuboid locking element 1220 instead of a locking bar. The top wall 1310 of the support 1300 includes multiple locking element receiving opening defining surfaces (not labeled) that define a square-shaped locking element receiving opening 1370 through the top wall 1310.

Figure 4D:
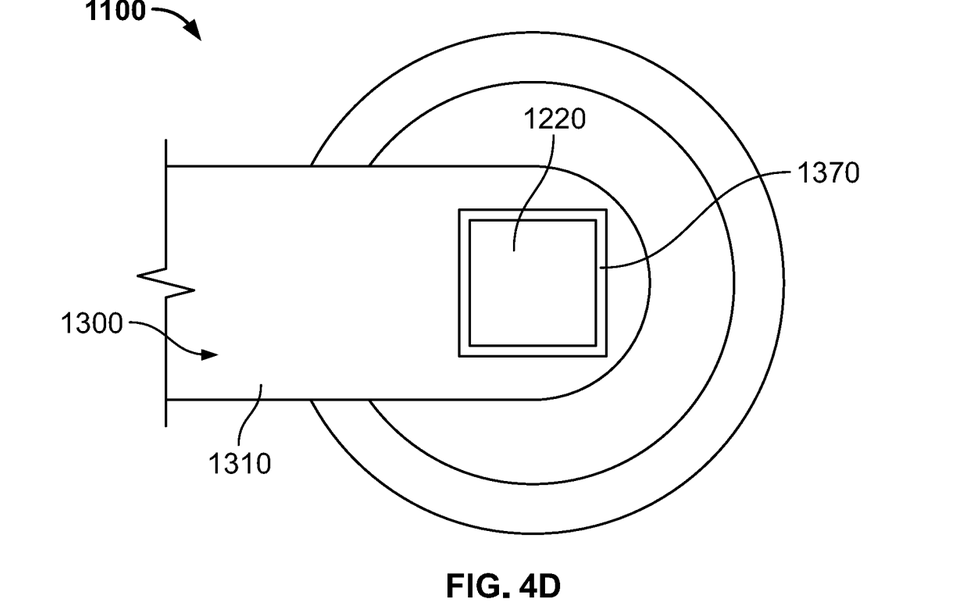
FIG. 4D is a fragmentary bottom plan view of the second example embodiment of the animal feeding apparatus after the locking device of the container has been received in the locking device receiving opening of the support and while the container is in an unlocked rotational position relative to the support.

The container 1100 is removably mountable to and releasably lockable to the support 1300 via the locking device 1200. To mount the container 1100 to the support 1300, a user first positions the container 1100 such that the container 1100 is in the unlocked rotational position relative to the support 1300. In this example embodiment, the container 1100 is in the unlocked rotational position relative to the support 1300 when the locking element 1220 is oriented to be entirely received in the locking element receiving opening 1370. While maintaining the container 1100 in the unlocked rotational position relative to the support 1300, the user then moves the container 1100 toward the support 1300 such that the locking element 1220 is received in the locking element receiving opening 1370 and the outer surface 1120*a* of the bottom wall 1120 of the container 1100 contacts the top wall 1310. This mounts the container 1100 to the support 1300, as shown in FIG. 4D.

Figure 4E:
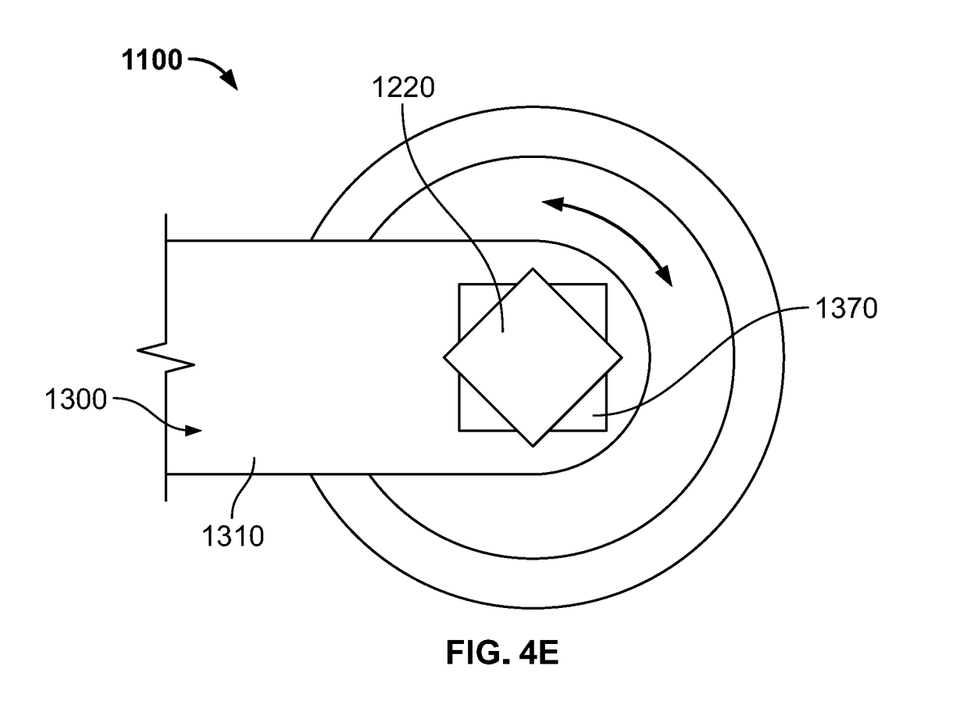
FIG. 4E is a fragmentary bottom plan view of the second example embodiment of the animal feeding apparatus after the container has been rotated relative to the support into a locked rotational position.

To (releasably) lock the container 1100 to the support 1300, the user rotates the container 1100 45 degrees (or any other suitable angle in other embodiments) relative to the support 1300 from the unlocked rotational position to the locked rotational position. When in the locked rotational position, as shown in FIG. 4E, the locking element 1220 is rotationally offset from the locking element receiving opening 1370, which prevents the container 1100 from being lifted off of the support 1300.

Figure 5A:
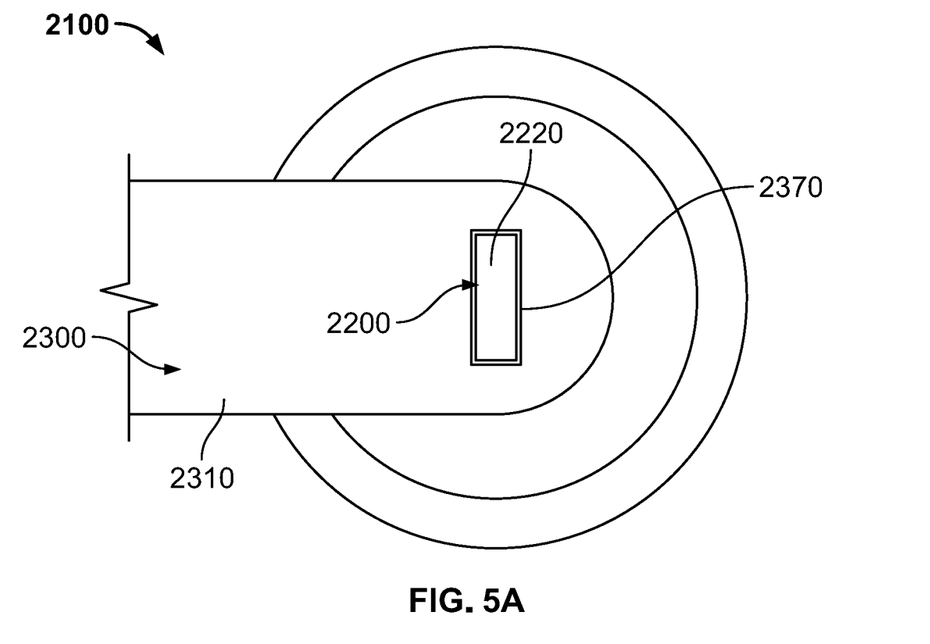
FIG. 5A is a fragmentary bottom plan view of a third example embodiment of the animal feeding apparatus of the present disclosure after the locking device has been received in the locking device receiving opening of the support and while the container is in an unlocked rotational position relative to the support.
Figure 5B:
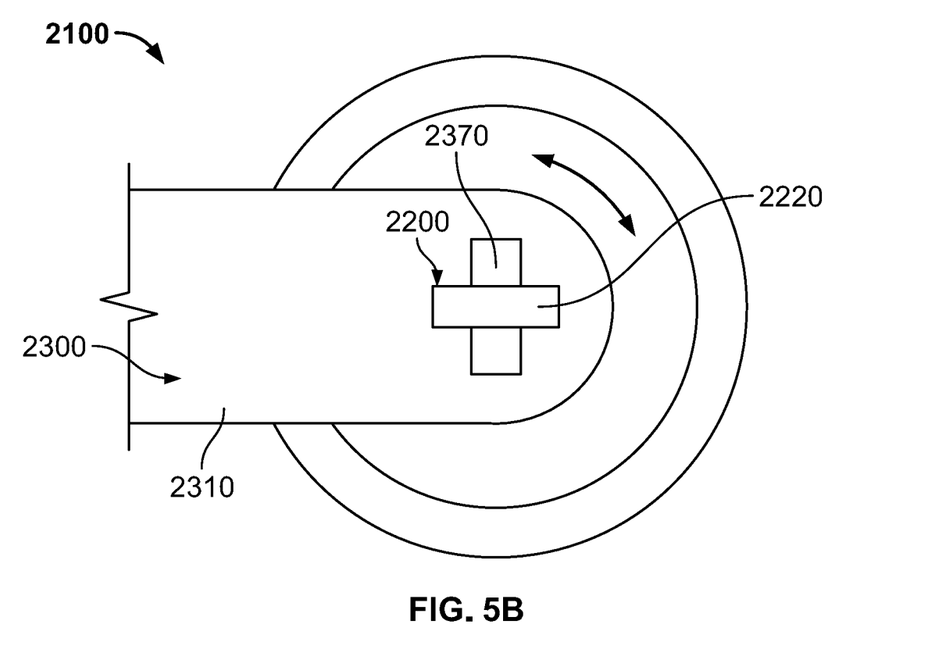
FIG. 5B is a fragmentary bottom plan view of the third example embodiment of the animal feeding apparatus after the container has been rotated relative to the support into a locked rotational position.

FIGS. 5A-5B illustrate another example embodiment of the animal feeding apparatus of the present disclosure and components of the animal feeding apparatus. Many components of this example embodiment of the animal feeding apparatus are similar (or identical) to those of the animal feeding apparatus 10, so like components of this example embodiment of the animal feeding apparatus are given like numbering (prefaced by a "2"). Certain differences between the embodiments are described below.

In this example embodiment, the top wall 2310 of the support 2300 includes multiple locking element receiving opening defining surfaces (not labeled) that define a rectangle-shaped locking element receiving opening 2370 through the top wall 2310.

The container 2100 is removably mountable to and releasably lockable to the support 2300 via the locking device 2200. To mount the container 2100 to the support 2300, a user first positions the container 2100 such that the container 2100 is in the unlocked rotational position relative to the support 2300. In this example embodiment, the container 2100 is in the unlocked rotational position relative to the support 2300 when the locking element 2220 is oriented to be entirely received in the locking element receiving opening 2370. While maintaining the container 2100 in the unlocked rotational position relative to the support 2300, the user then moves the container 2100 toward the support 2300 such that the locking element 2220 is received in the locking element receiving opening 2370 and the outer surface 2120*a* of the bottom wall 2120 of the container 2100 contacts the top wall 2310. This mounts the container 2100 to the support 2300, as shown in FIG. 5A.

To (releasably) lock the container 2100 to the support 2300, the user rotates the container 2100 90 degrees (or any other suitable angle in other embodiments) relative to the support 2300 from the unlocked rotational position to the locked rotational position. When in the locked rotational position, as shown in FIG. 5B, the locking element 2220 is rotationally offset from (here perpendicular to) the locking element receiving opening 2370, which prevents the container 2100 from being lifted off of the support 2300.

Figure 6:
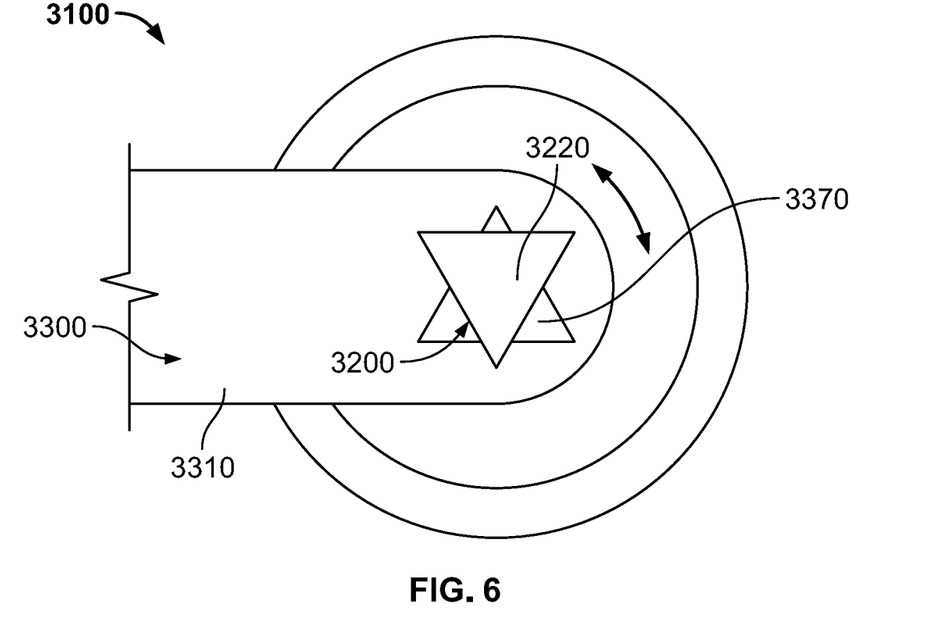
FIG. 6 is a fragmentary bottom plan view of a fourth example embodiment of the animal feeding apparatus of the present disclosure after the container has been rotated relative to the support into a locked rotational position.

FIG. 6 illustrates another example embodiment of the animal feeding apparatus of the present disclosure and components of the animal feeding apparatus. Many components of this example embodiment of the animal feeding apparatus are similar (or identical) to those of the animal feeding apparatus 10, so like components of this example embodiment of the animal feeding apparatus are given like numbering (prefaced by a "3"). Certain differences between the embodiments are described below.

In this example embodiment, the locking device 3200 includes a triangular locking element 3220 instead of a locking bar. The top wall 3310 of the support 3300 includes multiple locking element receiving opening defining surfaces (not labeled) that define a triangle-shaped locking element receiving opening 3370 through the top wall 3310.

The container 3100 is removably mountable to and releasably lockable to the support 3300 via the locking device 3200. To mount the container 3100 to the support 3300, a user first positions the container 3100 such that the container 3100 is in the unlocked rotational position relative to the support 3300. In this example embodiment, the container 3100 is in the unlocked rotational position relative to the support 3300 when the locking element 3220 is oriented to be entirely received in the locking element receiving opening 3370. While maintaining the container 3100 in the unlocked rotational position relative to the support 3300, the user then moves the container 3100 toward the support 3300 such that the locking element 3220 is received in the locking element receiving opening 3370 and the outer surface 3120*a* of the bottom wall 3120 of the container 3100 contacts the top wall 3310. This mounts the container 3100 to the support 3300.

To (releasably) lock the container 3100 to the support 3300, the user rotates the container 3100 60 degrees (or any other suitable angle in other embodiments) relative to the support 3300 from the unlocked rotational position to the locked rotational position. When in the locked rotational position, the locking element 3220 is rotationally offset from the locking element receiving opening 3370, which prevents the container 3100 from being lifted off of the support 3300.

Figure 7A:
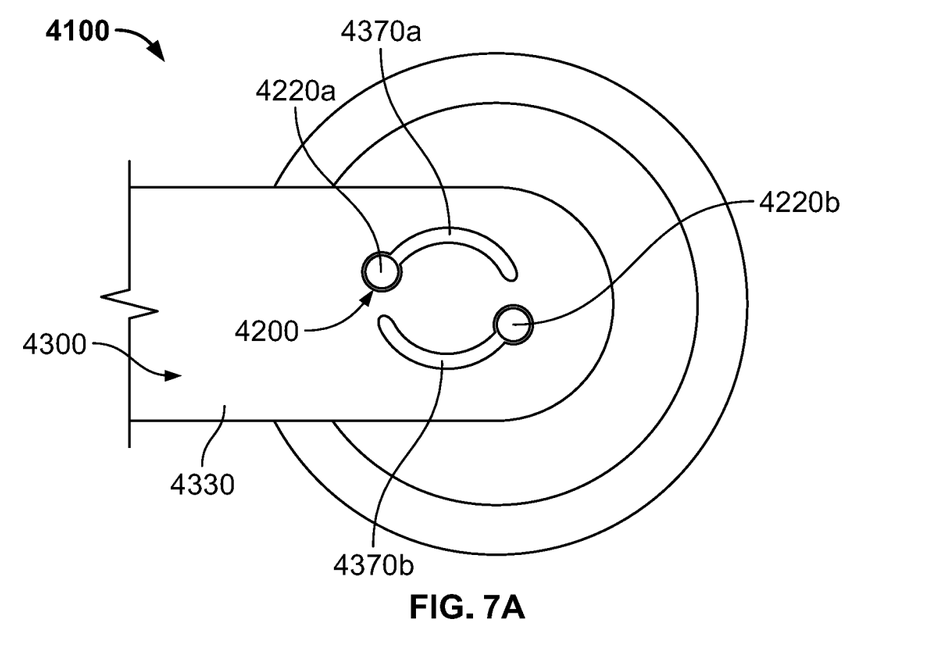
FIG. 7A is a fragmentary bottom plan view of a fifth example embodiment of the animal feeding apparatus of the present disclosure after the locking devices have been received in the locking device receiving openings of the support and while the container is in an unlocked rotational position relative to the support.
Figure 7B:
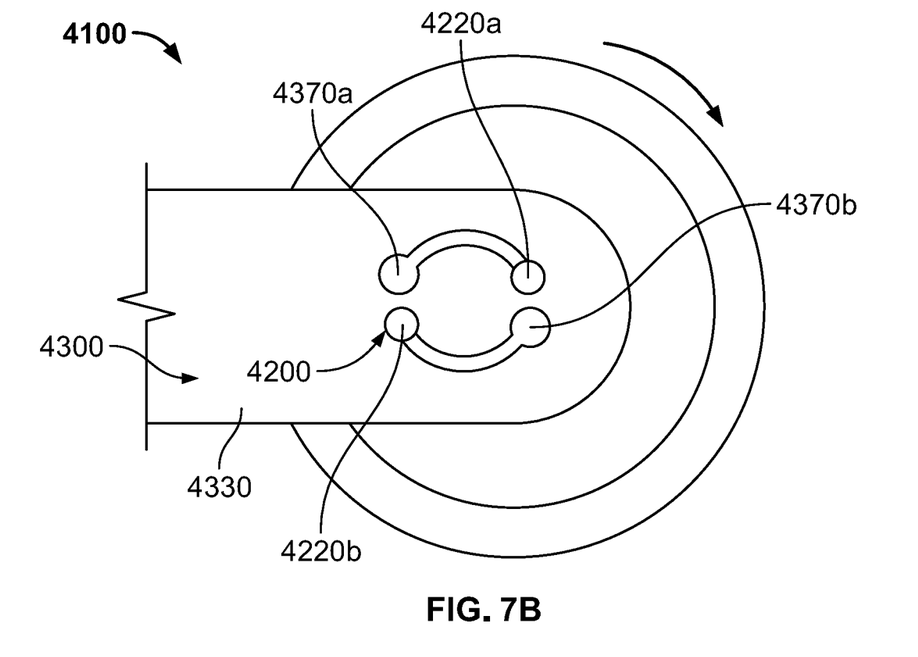
FIG. 7B is a fragmentary bottom plan view of the second example embodiment of the animal feeding apparatus after the container has been rotated relative to the support into a locked rotational position.

FIGS. 7A-7B illustrate another example embodiment of the animal feeding apparatus of the present disclosure and components of the animal feeding apparatus. Many components of this example embodiment of the animal feeding apparatus are similar (or identical) to those of the animal feeding apparatus 10, so like components of this example embodiment of the animal feeding apparatus are given like numbering (prefaced by a "4"). Certain differences between the embodiments are described below.

In this example embodiment, the locking device 4200 includes two disc-shaped locking elements 4220*a* and 4220*b* instead of a single locking bar. In an embodiment, the locking elements 4220a and 4220b can be screws, bolts, nails, brads, or similar devices. The diameters of the locking elements 4220a and 4220b are larger than the diameters (or widths) of the transverse cross-sections of their respective shafts (not shown). The top wall 4310 of the support 4300 includes multiple locking element receiving opening defining surfaces (not labeled) that define multiple curved locking element receiving openings 4370a and 4370b through the top wall 4310. Each locking element receiving opening has a circular entryway sized to receive one of the locking elements 4220a and 4220b and a curved slot extending from the entryway and terminating in a closed end. The widths of the curved slots are larger than the diameters of the shafts of the locking elements but smaller than the diameters of the locking elements.

The container 4100 is removably mountable to and releasably lockable to the support 4300 via the locking device 4200. To mount the container 4100 to the support 4300, a user first positions the container 4100 such that the container 4100 is in the unlocked rotational position relative to the support 4300. In this example embodiment, the container 4100 is in the unlocked rotational position relative to the support 4300 when the locking elements 4220a and 4220b are oriented to be entirely received in the entryways of their corresponding locking element receiving openings 4370a and 4370b. While maintaining the container 4100 in the unlocked rotational position relative to the support 4300, the user then moves the container 4100 toward the support 4300 such that the locking elements 4220a and 4220b are received in the entryways of their respective locking element receiving openings 4370a and 4370b and the outer surface 4120a of the bottom wall 4120 of the container 4100 contacts the top wall 4310. This mounts the container 4100 to the support 4300, as shown in FIG. 7A.

To (releasably) lock the container 4100 to the support 4300, the user rotates the container 4100 90 degrees (or any other suitable angle in other embodiments) relative to the support 4300 from the unlocked rotational position to the locked rotational position. When in the locked rotational position, as shown in FIG. 7B, the locking elements 4220a and 4220b are at the closed ends of the slots of their respective locking element receiving openings 4370a and 4370b. The fact that the locking elements 4220a and 4220b have diameters larger than the widths of their respective slots prevents the container 4100 from being lifted off of the support 4300.

FIGS. 8A-8F illustrate another example embodiment of the animal feeding apparatus of the present disclosure and components of the animal feeding apparatus. Many components of this example embodiment of the animal feeding apparatus are similar (or identical) to those of the animal feeding apparatus 10, so like components of this example embodiment of the animal feeding apparatus are given like numbering (prefaced by a "5"). Certain differences between the embodiments are described below.

In this example embodiment, the locking device 5200 including the shaft 5210 and the locking bar 5220 is attached to the top wall 5310 of the support 5300 instead of the container 5100. Here, a bracket 5400 including side walls 5410 and 5420 and a bottom wall 5430 is attached to the container 5100. The bottom wall 5430 includes multiple locking element receiving opening defining surfaces (not labeled) that define a locking element receiving opening 5470 through the bottom wall 5430.

Figure 8A:
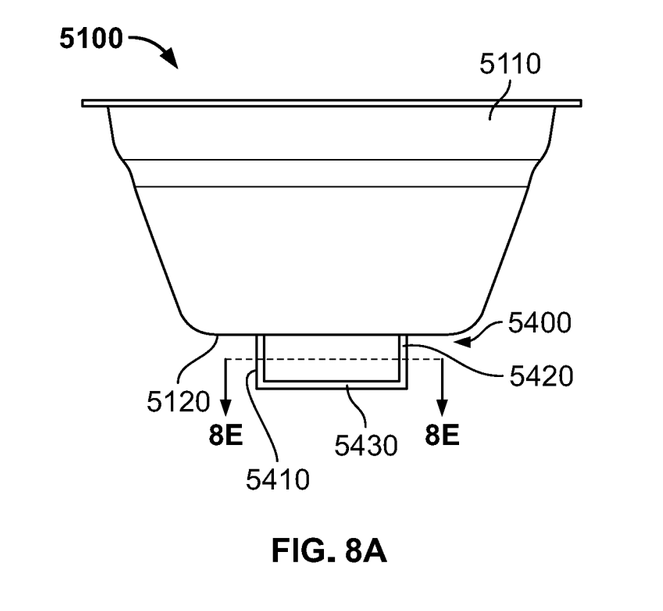
FIG. 8A is a front elevational view of the container of a sixth example embodiment of the animal feeding apparatus of the present disclosure.
Figure 8B:
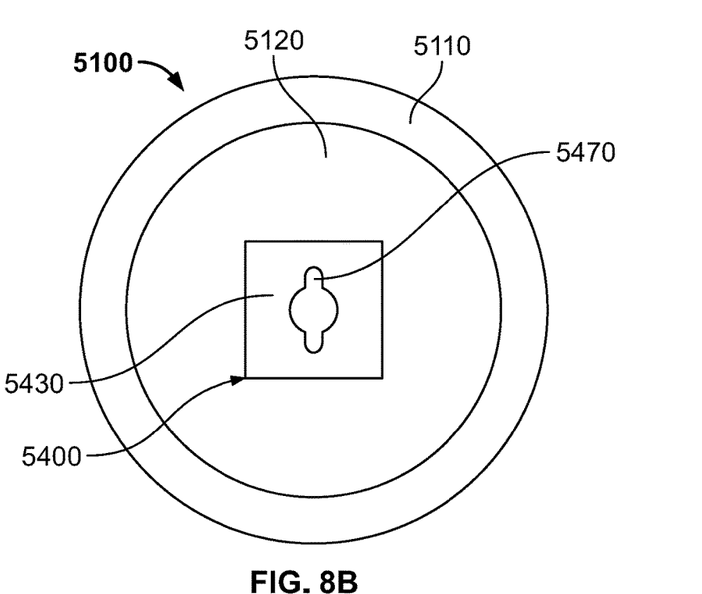
FIG. 8B is a bottom plan view of the container of FIG. 8A.
Figure 8C:
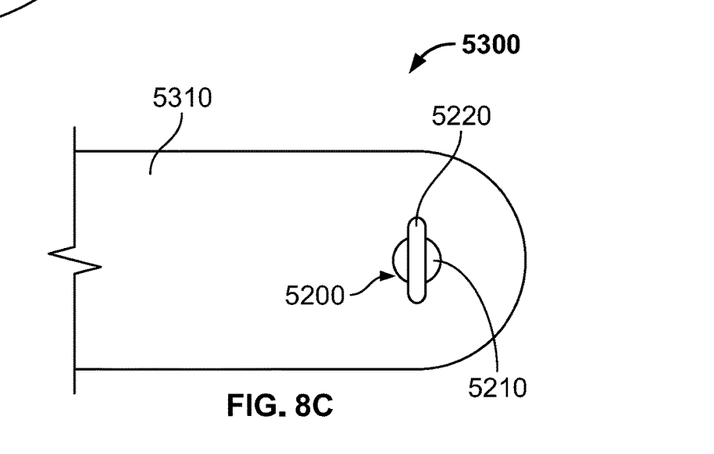
FIG. 8C is a fragmentary top plan view of the support of the sixth example embodiment of the animal feeding apparatus of the present disclosure.
Figure 8D:
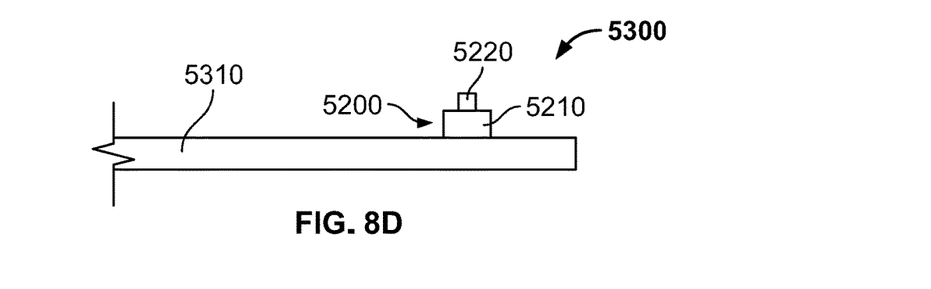
FIG. 8D is a fragmentary side elevational view of the support of FIG. 8C.
Figure 8E:
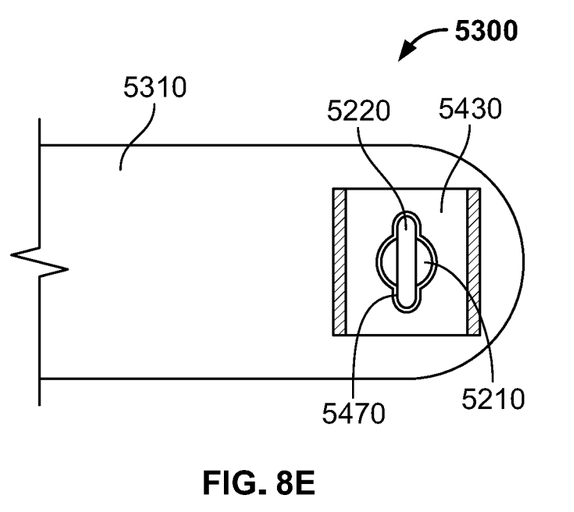
FIG. 8E is a fragmentary cross-sectional top plan view of the sixth example embodiment of the animal feeding apparatus (taken substantially along line 8E-8E of FIG. 8A) after the locking device of the support has been received in the locking device receiving opening of the container and while the container is in an unlocked rotational position relative to the support.

The container 5100 is removably mountable to and releasably lockable to the support 5300 via the locking device 5200 and the bracket 5400. To mount the container 5100 to the support 5300, a user first positions the container 5100 such that the container 5100 is in the unlocked rotational position relative to the support 5300. In this example embodiment, the container 5100 is in the unlocked rotational position relative to the support 5300 when the container 5100 is oriented to receive the entire locking element 5220 in the locking element receiving opening 5470. While maintaining the container 5100 in the unlocked rotational position relative to the support 5300, the user then moves the container 5100 toward the support 5300 such that the locking element 5220 is received in the locking element receiving opening 5470 and the bottom wall 5430 of the bracket 5400 contacts the top wall 5310. This mounts the container 5100 to the support 5300, as shown in FIG. 8E.

Figure 8F:
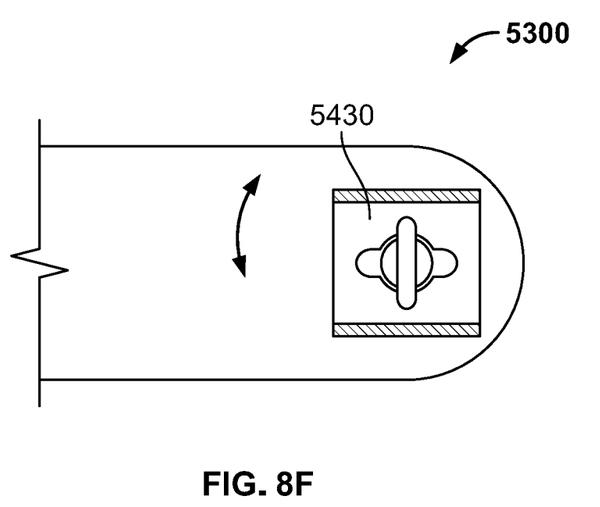
FIG. 8F is a fragmentary cross-sectional top plan view of the sixth example embodiment of the animal feeding apparatus (taken substantially along line 8E-8E of FIG. 8A) after the container has been rotated relative to the support into a locked rotational position.

To (releasably) lock the container 5100 to the support 5300, the user rotates the container 5100 (and thus the bracket 5400 attached thereto) 90 degrees (or any other suitable angle in other embodiments) relative to the support 5300 from the unlocked rotational position to the locked rotational position. When in the locked rotational position, as shown in FIG. 8F, the locking element 5220 is rotationally offset (here generally perpendicular to) from the locking element receiving opening 5470, which prevents the container 5100 from being lifted off of the support 5300.

Figure 9:
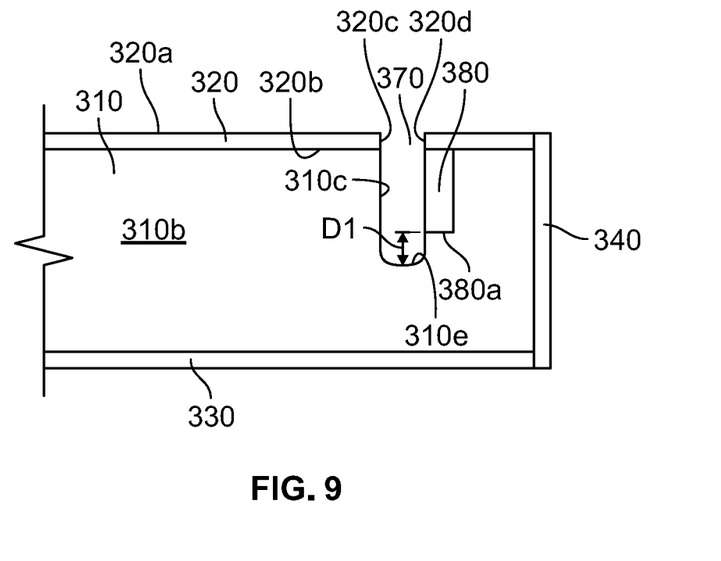
FIG. 9 is a fragmentary bottom plan view of the support of another example embodiment of the animal feeding apparatus of the present disclosure.

FIG. 9 is a fragmentary bottom plan view of the support of another example embodiment of the animal feeding apparatus of the present disclosure. This support is identical to the support 300 described above with reference to FIGS. 1A-3D except that the support does not include the second stop element 390. The first stop element 380 is sized, shaped, and positioned such that it prevents the container from rotating any further after the container reaches the locked rotational position and such that it prevents the shaft from sliding out of the locking device receiving opening 370 (as described above).

While the features, methods, devices, and systems described herein may be embodied in various forms, the drawings show and this patent application describes some exemplary and non-limiting embodiments. Not all of the depicted components described in this patent application may be required, and some implementations may include additional, different, or fewer components from those described. Variations in the arrangement and type of the components; the shapes, sizes, and materials of the components; and the manners of attachment and connections of the components may be made without departing from the spirit or scope of the claims as set forth herein.

Unless otherwise indicated, any directions referred to herein reflect the orientations of the components shown in the corresponding drawings and do not limit the scope of the present disclosure. This specification is intended to be taken as a whole and interpreted in accordance with the principles of the invention as taught herein and understood by one of ordinary skill in the art.

I claim:
1. An animal feeding apparatus comprising:
a container comprising a bottom wall and a locking device attached to the bottom wall, the locking device comprising a shaft and a locking bar transverse to the shaft; and
a support comprising a wall defining an opening therethrough and a stop element attached to the wall, wherein the opening has an open end and a closed end and is sized to laterally receive the shaft through the open end, wherein the stop element is positioned to limit rotation of the container relative to the support when the shaft is received in the opening and positioned at the closed end of the opening.

2. The animal feeding apparatus of claim 1, wherein the support further comprises a second stop element attached to the wall, and wherein the second stop element is positioned to limit rotation of the container relative to the support when the shaft is received in the opening and positioned at the closed end of the opening.

3. The animal feeding apparatus of claim 2, wherein the stop element and the second stop element project away from the wall of the support and are positioned to limit rotation of the container relative to the support between an unlocked position and a locked position when the shaft is received in the opening and positioned at the closed end of the opening.

4. The animal feeding apparatus of claim 3, wherein the locking bar contacts the stop element and the second stop element when the container is in the locked position relative to the support when the shaft is received in the opening and positioned at the closed end of the opening.

5. The animal feeding apparatus of claim 4, wherein the bottom wall of the container contacts the wall of the support when the container is in the locked position relative to the support when the shaft is received in the opening and positioned at the closed end of the opening.

6. The animal feeding apparatus of claim 5, wherein the wall of the support is positioned between the bottom wall of the container and the locking bar when the container is in the locked position relative to the support when the shaft is received in the opening and positioned at the closed end of the opening.

7. The animal feeding apparatus of claim 4, wherein the locking bar is transverse to the opening when the container is in the locked position relative to the support when the shaft is received in the opening and positioned at the closed end of the opening.

8. The animal feeding apparatus of claim 7, wherein a length of the locking bar is greater than a width of the opening.

9. The animal feeding apparatus of claim 1, wherein the wall of the support comprises a top wall and the support further comprises a side wall connected to the top wall, wherein the opening is also defined through the side wall to form the open end of the opening.

10. The animal feeding apparatus of claim 9, wherein the opening extends transverse to the side wall.

11. The animal feeding apparatus of claim 10, wherein the support further comprises a second stop element attached to the top wall, wherein the second stop element is positioned to limit rotation of the container relative to the support when the shaft is received in the opening and positioned at the closed end of the opening, and wherein the stop element and the second stop element are positioned on opposite sides of the opening.

12. The animal feeding apparatus of claim 11, wherein the bottom wall of the container contacts the top wall of the support when the container is in the locked position relative to the support when the shaft is received in the opening and positioned at the closed end of the opening.

13. The animal feeding apparatus of claim 1, wherein a length of the locking bar is greater than a width of the opening.

14. The animal feeding apparatus of claim 1, wherein a length of the shaft is at least as large as a thickness of the wall of the support.

15. The animal feeding apparatus of claim 14, wherein the wall of the support is positioned between the bottom wall of the container and the locking bar when the shaft is received in the opening and positioned at the closed end of the opening.

16. A method of installing an animal feeding apparatus comprising a container, a locking device attached to a bottom wall of the container, and a support, the method comprising:
    while the container is in an unlocked position relative to the support, inserting a shaft of the locking device into an open end of a laterally extending opening defined through a wall of the support;
    laterally moving the container relative to the support until the shaft reaches a closed end of the opening; and
    rotating the container relative to the support in a first rotational direction until a locking bar transverse to the shaft contacts a stop element attached to the wall of the support to move the container from the unlocked position to the locked position,
    wherein the stop element prevents further rotation of the container relative to the support in the first rotational direction,
    wherein the locking bar is transverse to the opening when the container is in the locked position.

17. The method of claim 16, wherein a length of the locking bar is greater than a width of the opening.

18. The method of claim 16, wherein a length of the shaft is at least as large as a thickness of the wall of the support.

19. The method of claim 18, wherein the wall of the support is positioned between the bottom wall of the container and the locking bar when the shaft is received in the opening and positioned at the closed end of the opening.

* * * * *